United States Patent [19]

Chivian et al.

[11] 3,831,165
[45] Aug. 20, 1974

[54] APPARATUS AND METHOD FOR AFFECTING THE CONTRAST OF THERMOCHROMIC DISPLAYS

[75] Inventors: Jay S. Chivian, Richardson; Dayton D. Eden, Dallas, both of Tex.

[73] Assignee: Advanced Technology Center Inc., Grand Prairie, Tex.

[22] Filed: Oct. 26, 1971

[21] Appl. No.: 192,124

Related U.S. Application Data

[63] Continuation-in-part of Ser. No. 825,691, May 19, 1969, abandoned.

[52] U.S. Cl. ...... 340/324 R, 178/6.6 TP, 346/76 R, 350/160 P
[51] Int. Cl. ............................................. G08b 5/36
[58] Field of Search ............... 350/160 P; 346/76 R; 178/DIG. 31, 6.6 TP; 340/324 R, 173 MA

[56] References Cited
UNITED STATES PATENTS

| | | | |
|---|---|---|---|
| 3,064,134 | 11/1962 | Kell | 350/160 P X |
| 3,219,993 | 11/1965 | Schwertz | 340/324 R |
| 3,323,241 | 6/1967 | Blair et al. | 350/160 P X |
| 3,438,022 | 4/1969 | Teeg et al. | 350/160 P X |
| 3,496,662 | 2/1970 | Choate | 346/135 X |
| 3,533,823 | 10/1970 | Newkirk et al. | 346/76 R X |
| 3,655,256 | 4/1972 | Claytor | 350/160 P X |

*Primary Examiner*—David L. Trafton

[57] ABSTRACT

Display devices utilize thermotropic materials for recording and displaying information. The display devices incorporate a thermochromic film disposed between a pair of electrically conductive plates, one of which is transparent. Reflectivity of the film is altered by selectively changing the temperature of discrete portions of the film, and hysteresis in the thermochromic material is relied on to retain the information stored in the film for as long as it is needed. The electrically conductive plates may be used as one means to selectively heat the film so as to enhance a thermally generated image. Also disclosed are methods for changing information recorded in such displays.

20 Claims, 6 Drawing Figures

APPARATUS AND METHOD FOR AFFECTING THE CONTRAST OF THERMOCHROMIC DISPLAYS

This is a continuation-in-part of U.S. Pat. Ser. No. 825,691 filed May 19, 1969, and now abandoned.

This invention relates to optical displays, and particularly to display apparatus and methods for converting electrical or optical signals to graphic displays, and to devices for recording optical display information.

Conventional optical display devices take many forms. Most common among display devices are evacuated tubes having a phosphor on the display surface which flouresces under stimulation with an energy source such as an electron beam. The common television screen and oscilloscope tube are typical of this type of display. Except for the decay time or phosphorescence of such display systems, the image or trace displayed on the device is only momentarily visible. In such active display systems, prolonged display of the same character can only be accomplished by continuous or repeated stimulation of the phosphor.

In many display systems, it would be highly advantageous to trace an image on the display screen with a single sweep of the energy source and have the character remain visibly displayed for long periods of time to allow visual inspection of the image. It is also desirable to erase portions of the displayed character at will and substitute additional information without affecting or otherwise altering other information displayed. While some devices incorporate memory apparatus wherein information is recorded and replayed upon interrogation, conventional displays generally lack the ability to record and display information simultaneously.

A passive display system is disclosed in U.S. Pat. No. 3,438,022 to Teeg et al. which overcomes some of the disadvantages of the phosphor-type systems, but it relies solely on thermal stimuli to effect a change in the display and thus is dependent on the power of the thermal source. Furthermore, according to the Teeg disclosure, erasing is accomplished only by changing the temperature of the film beyond one end of the hysteresis loop, which can require the exchange of a substantial amount of thermal energy. It is now known that erasing can be achieved in an alternate manner, and therefore this invention may be considered to be an improvement over the aforementioned Teeg patent.

Briefly, the present invention comprises a passive display, i.e., a display utilizing reflected light, which initially responds to suitable thermal energy such as an electron beam or a beam of optical energy. Display is effected by altering the reflectance of selected portions of thermochromic material as desired to produce an optical image, either with thermal energy alone or a combination of thermal and electrical energy. In addition to the material's reflectance, its electrical conductivity exhibits hysteresis. This fact can be used to advantage to enhance a weak thermal image by passing more electrical current through certain portions of the film than through other portions. The recorded image can be erased as desired and up-dated or corrected by writing new information into the display. The existance of recorded information can also be determined by electronic interrogation by measuring the relative electrical conductivity of portions of the thermochromic material. Accordingly, an eraseable memory display is provided on which information can be simultaneously recorded, displayed for visual examination, and read electrically.

Other features and advantages will become more readily understood from the following detailed description taken in connection with the appended claims and attached drawings in which:

The term "thermochromic material" as used herein refers to those materials which exhibit hysteresis in changing from a first reflectance to a second reflectance (in a portion of the visible spectrum) with change in temperature over a certain range. For example, compounds having a general formula $M_2M'X_4$, where M may be $Ag^{1+}$, $Cu^{1+}$ or $Tl^{1+}$, M' may be $Hg^{2+}$ or $Cd^{2+}$, and X is a halide, are known to exhibit thermochromism. Besides the ternary halides, other compounds exhibit thermochromism, including certain transition metal oxides (e.g., the vanadium oxides) and several ternary chalcogenides having the formula $MM'_2X_4$ where M is zinc, cadmium or mercury, M' is aluminum, gallium or indium, and X is sulphur, selenium or tellurium.

In accordance with this invention, the above-described materials can be used in the form of a film or paint formed by suspending a finely divided powder of such materials in a suitable binder. The binder, however, is used merely as a convenient means to support a uniform layer of the thermochromic material. Other means for providing a substantially uniform layer of thermochromic material are also within the intended scope of the invention. For convenience, the term "thermochromic film" is generally used herein to designate a layer, film or paint consisting essentially of materials of the class described which are suspended in any suitable medium or which are produced by any acceptable means. Furthermore, since all such materials exhibit thermochromism (i.e., change of color) as a consequence of a thermodynamic phase transition, cuprous mercuric iodide ($Cu_2HgI_4$) will be discussed hereinafter as exemplary of the entire class of compounds. It should be understood, however, that $Cu_2HgI_4$ is used herein as a typical example of thermochromic materials merely by way of illustration and not by limitation. Under proper conditions, other materials of the defined class exhibit the phenomena described herein and may be substituted for $Cu_2HgI_4$ in appropriate application of the principles of this invention. Since the principles of the invention rely in part on certain phenomena exhibited by thermochromic material, it is perhaps appropriate to discuss these phenomena in detail.

Figure 1:
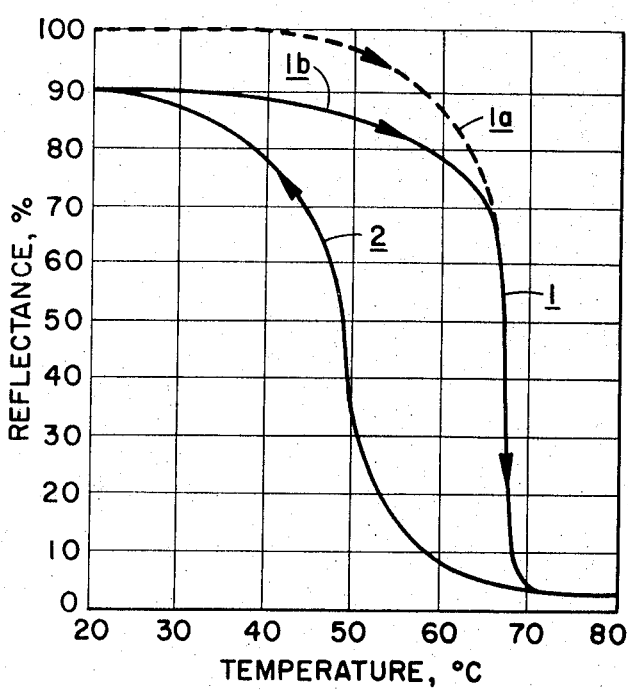
FIG. 1 is a plot of reflectance of red light (6,328A) versus temperature for an exemplary thermochromic material, cuprous mercuric iodide.

The hysteresis effect observed in cuprous mercuric iodide is graphically illustrated in FIG. 1, wherein the ordinate represents percent reflectance of red light (6,328A) and the abscissa represents temperature. Line 1 represents the plot of reflectance versus temperature as the material is heated from room temperature to approximately 80° C. It will be observed that cuprous mercuric iodide is a bright red at room temperature and retains its full brightness until it reaches approximately 45° C. Thereafter, increasing the temperature causes the material gradually to lose some of its reflectance. After reaching about 66° C the reflectance decreases rapidly until the material appears so dark that it may be properly described as black near 70° C; further increase in temperature has little appreciable effect on the color of the material. Above about 70° C the material may be described as being in its saturated black state, and additional heating produces no appreciable change in reflectance until temperatures are reached which cause chemical change, such as oxidation.

When the same material is cooled from its saturated black condition, a plot of reflectance versus temperature does not follow the same path it followed when the temperature was being increased. Rather than being completely reversible, the material demonstrates what is conveniently referred to as a "hysteresis effect." The hysteresis effect may be described as the possible existence of a plurality of reflectances for a given temperature within a certain temperature range. The reflectance of the material increases with decreasing temperature along a path indicated by line 2 which is displaced some 16° or 17° below (i.e., to the left of) the temperature-increasing path indicated by line 1. The rate of increase in reflectance is reduced as the material cools to about 45° C, and the material does not reach its maximum reflectance (i.e., it is not red saturated) until it reaches about 30° C. As with a temperature increase above the black saturated condition, a temperature decrease below 30° C has little effect. Once the material is red saturated, a further decrease in temperature produces essentially no further change in reflectivity.

Although the hysteresis effect as described above has been previously observed, it has sometimes been attributed to impurities in the material rather than a real hysteresis effect. It has been discovered, however, that the hysteresis effect is real, consistent, and reproducible, and that thermochromic materials exhibit other phenomena which may be utilized in conjunction with the hysteresis effect in performing many unique functions.

It should be noted that in some thermochromic paints, the hysteresis curve may not be truly symmetrical (in the classical sense), particularly if the temperature cycle time is short. For example, it has been experimentally observed that a film of cuprous mercuric iodide in a varnish binder may not immediately recover its full red reflectance when rapidly cooled from a high temperature. Thus, when the material is rapidly cooled to about room temperature, because of this delayed recovery the material may not immediately reach the original 100 percent red saturation condition. In the initial cold state, the hysteresis curve proceeds along line 1a – 1 and, upon cooling, follows line 2. If the material is reheated shortly after the above-described cooling, the increasing-temperature versus reflectance plot will follow line 1b – 1. However, with sufficient time lapse between cooling and reheating, the low temperature reflectance will again approach the 100 percent red saturation condition. Delayed recovery is of little consequence to the recording steps in this invention, however, since it occurs near the low temperature end of the hysteresis loop; in most cases involving recording, the material is used at temperatures near the red-to-black transition temperature. Said red-to-black transition temperature is defined as the point on a temperature-increasing curve at which the curve has an inflection point. For simplicity, the hysteresis curves will usually be referred to as if they were always like the curve shown in lines 1b – 1 and 2, i.e., as if they were essentially as symmetrical as classical hysteresis curves.

Since the temperature at which a thermochromic material can be accurately said to be 100 percent saturated is difficult to ascertain (because it approaches a true 100 percent saturation condition asymptotically), it is more practical to assign the term "saturated" to any reflectance condition which is within about 5 percent of a pure saturation condition (disregarding the aforementioned delayed recovery effect). Thus, cuprous mercuric iodide in its cold state (after being cycled through the hysteresis loop) can be said to be red saturated at any reflectance measured within 5 percent of the top of the loop, while the material in its heated condition may be said to be black saturated when its reflectance is within 5 percent of the height of the loop above the pure black saturated reflectance.

While necessity dictates that a reflectivity of 5 percent or less, for example, be accepted as equivalent to no reflectivity, prudence dictates that the definition of saturation should not be treated too loosely. Hence, it is not intended herein to use the term "saturation" so as to encompass, for example, reflectances well between the knees of the hysteresis envelope.

The two paths traced on FIG. 1 indicating reflectance of the material in transition between its two extreme reflectances form a loop which constitutes the envelope that will enclose all of the paths followed by the material regardless of its temperature history. The hysteresis loop, then, may be said to be bounded on its high end by the minimum temperature at which the material is black saturated, and bounded on its low end by the maximum temperature at which the material is red saturated. The fact that the ends of a loop may not always be precisely locatable with a particular material is of little consequence, since the operating region of the invention is usually in the vicinity of the center of the transition temperature range.

Figure 2:
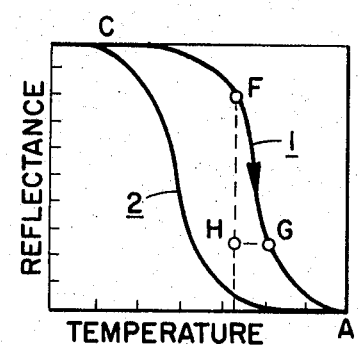
FIG. 2 is a schematic plot of reflectance versus temperature similar to FIG. 1.

Characteristic behavior of thermochromic materials within the hysteresis loop is schematically illustrated in FIG. 2.

As explained above, a thermochromic material will exhibit a change in reflectance upon being heated which is indicated by line 1. As the material is heated along line 1 from point C to point F, its reflectance begins to change. If, however, part of the material is held at a constant temperature equivalent to point F and the remainder heated further along line 1 to point G, the two portions of the material will exhibit different reflectances. Furthermore, if the hotter portion of the material is allowed to cool without first being heated to point A, the decreasing-reflectance versus temperature plot will not follow line 1, but will be in the direction of point H. When the heated portion has cooled to the temperature of point H, the two portions of the material, although again at thermal equilibrium, will exhibit diverse reflectances as a result of their different thermal histories.

It should be noted that the plot of reflectance versus temperature for the material being cooled is shown for simplicity as a horizontal line from point G to point H. However, as with conventional hysteresis phenomena, the decreasing temperature plot of reflectance versus temperature will be in the general direction of line 2, but will eventually approach line 2 asymptotically.

The above discussion of inner hysteresis behavior is general enough to be valid for all thermochromic materials, but one of the materials ($Cu_2HgI_4$) has been found to have a property that seemingly sets it apart from the other materials. That property is the tendency upon cooling to more closely follow the temperature-increasing limit path rather than the temperature-decreasing limit path, until a particular path of the temperature-increasing path is reached. After the material has been heated to a sufficient extent, i.e., after it passes what may be thought of as a threshold, it "switches" and tends to cool along a path more nearly parallel to the temperature-decreasing line. This phenomenon can perhaps best be understood by reference to the following example.

A film of cuprous mercuric iodide suspended in a silicone varnish was placed on a stainless steel substrate. The dry film was then cycled several times through its hysteresis loop until it reached a limiting shape, i.e., a condition wherein there were no recordable differences between successive loops. This loop is identified in FIG. 3 by the lines 1 and 2. A bias temperature of 64° C is established in the film, which corresponds to point A in this figure. Next, heat is locally applied to several spots, with the incident power density being different for each spot. A small amount of power raises the temperature from that of point A to that of $B_1$, at which time an image (the spot) is visible because of the contrast, i.e., the difference in reflectance between that of A and that of $B_1$. When the illuminating source is turned off, the reflectance follows a path to $C_1$, after which there is no change because the locally heated portions have reached the temperature of the rest of the plate. As indicated, the final contrast (a–$C_1$) will be much reduced from the contrast once established (A – $B_1$), and the image can be said to have faded.

The extent to which this fading behavior can occur is shown by the sequence A → $B_2$ → $C_2$. When a power source locally heats portions of the plate to a temperature corresponding to point $B_2$, the visual contrast is initially quite large; but when the heat source is removed, the reflectance retreats to $C_2$, again showing substantial image fading.

Figure 3:
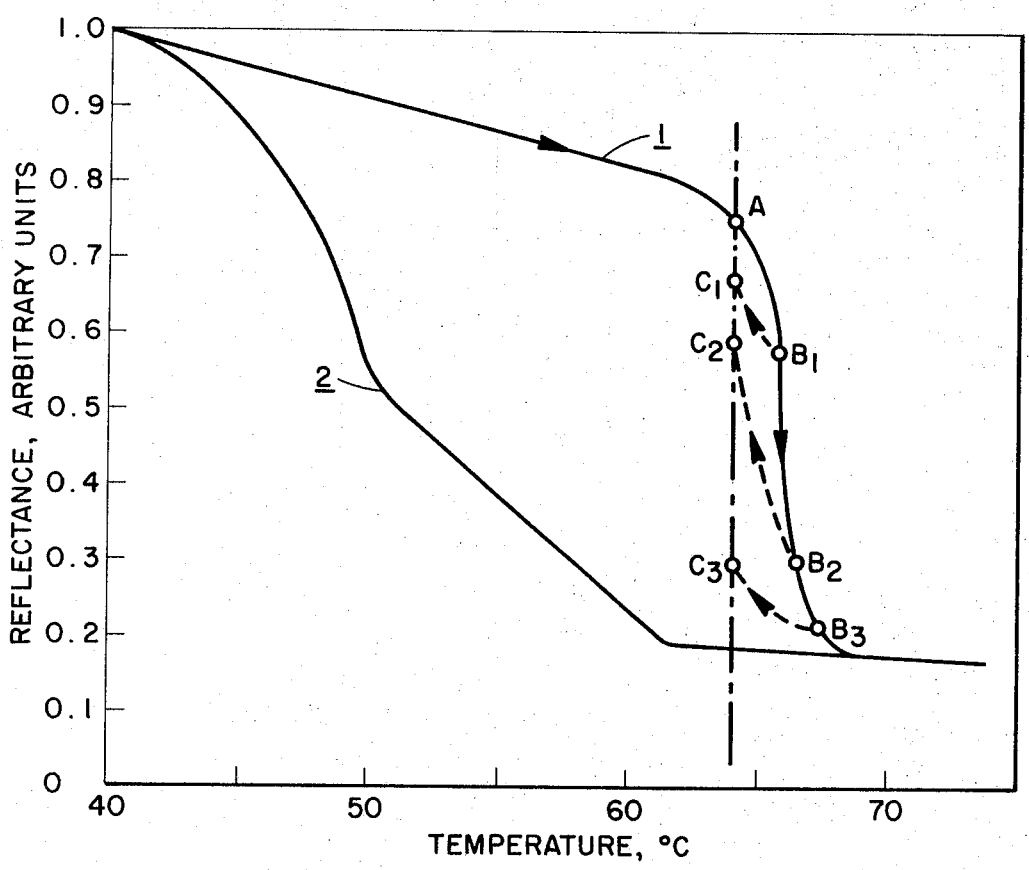
FIG. 3 is a plot of experimental results with cuprous mercuric iodide showing how the resultant contrast between an image and its background is affected by the intermediate heating temperature.

A certain power input density can be reached, however, such that the temperature of a heated spot on the surface reaches a point such as $B_3$. The spot $B_3$ (at about 68° C) is far enough along the temperature-increasing curve so that the path on cooling much more nearly approaches the temperature-decreasing part of the envelope, and a reflectance at $C_3$ is obtained which is characterized as providing a high residual contrast. The term "residual contrast" is aptly used, then, to refer to the contrast that exists between a heated spot and its background after thermal equilibrium has once again been established. In FIG. 3, the initial contrast is the difference between A and $B_3$, and the residual contrast is the difference between A and $C_3$. It is the residual contrast, of course, which can be semi-permanently stored, i.e., stored for as long as the bias temperature (64° C in this case) is maintained. All images can be erased, however, by simply heating the film to its black saturation temperature, i.e., to a temperature above the hysteresis loop.

The temporary images at points $B_1$ and $B_2$ were achieved with average input power densities of about 100 mW/cm$^2$ with relatively short exposure periods. A similar power density but longer exposure period was used to achieve the image at point $B_3$.

A significant advantage which can be gained from the above-described properties is that a relatively small heat input can be made to produce a substantial contrast in the thermochromic film — if the heat input is made under the right conditions. Let it be assumed, for example, that a source of infrared energy is somewhere in a field of view, and suitable optics are employed to focus that energy on a film of $Cu_2HgI_4$. If the film is biased at, say, 64° C and the focused energy is sufficient to raise the temperature of the spot by about 2° C, an initial change in reflectance of about 0.20 units (according to the scale of FIG. 3) is temporarily achieved, and a residual contrast of about 0.09 reflectance units is obtained. If, however, an auxiliary heat source is used to temporarily heat the entire plate by about 2° to 66° C and then the focused infrared energy is added, the focused energy can be enough to drive certain portions over the threshold (68° C) whereupon subsequent uniform cooling of the entire plate will enhance the contrast between the background and the focused image. Thus, if uniform heating of the entire plate carries it to point $B_2$, and focused energy then drives a localized spot to point $B_3$, a temporary contrast of only about 0.09 units is obtained. When the plate is allowed to cool back to a lower temperature, e.g., 64° C, the small contrast of 0.09 units between $B_2$ and $B_3$ becomes the much larger contrast between $C_2$ and $C_3$ (about 0.30 units). With a ternary iodide, then, the contrast in a thermally generated image can be enhanced by at least a factor of 3 by judicious control of plate temperature and time of imaging. Too, this so-called image enhancement capability can be used to record images with much lower power densities (e.g., 30 mW/cm$^2$) than might otherwise be deemed necessary. Another way of saying this is to describe a thermochromic plate as being more sensitive, in the sense that it responds to and records the presence of thermal stimuli that otherwise might not be recorded with sufficient clarity to be discernable.

Because cuprous mercuric iodide is a typical compound of the ternary halide family of compounds, it is natural that this same behavior be obtainable with the other compounds in the family. Some thermochromic compounds (e.g., the vanadium oxides), being different than the ternary halides, do not exhibit the threshold property described above. It should be noted that both the vanadium suboxides and the ternary halides are thermochromic materials, but the change in color of the vanadium suboxides is the result of a change of crystal structure, while the ternary halides change color as the result of an order/disorder transition.

It has also been discovered that certain thermochromic paints exhibit another phenomenon which is not analogous to magnetic memory; that is, a thermochromic film upon which an image has been formed by the techniques described above will retain the information stored therein even though the temperature of the film is temporarily lowered below the hysteresis loop. For example, if an entire film of thermochromic paint is heated from point C (referring again to FIG. 2) to point F, and part of the material is maintained at a temperature corresponding to point F while the remainder is heated to point G, the two portions will exhibit diverse reflectances as explained hereinabove. If the temperature of the entire film of material is then reduced below the temperature of point C (without being heated to a temperature above point A), the entire film will return to a condition in which the reflectances of all of its portions correspond to point C. To the unaided eye, the appearance of all of the material will be the same. However, the thermal histories of the two portions are different; and, upon reheating the material to a temperature at least as high as point F, the earlier obtained diverse reflectances will again be exhibited. Thus, the diverse thermal histories of the two portions have an effect on the thermochromic paint which permits re-establishment of the image recorded therein.

From the foregoing it will be observed that information recorded in certain paints through deliberately varied thermal conditions impressed on the material can be temporarily stored in the material by simply reducing the temperature thereof below the hysteresis loop. The stored information can be reproduced within a reasonable time by raising the temperature of the recording medium back to at least the bias temperature, e.g., point F. Of further advantage, when the recording medium is stored at a temperature below the "low" saturation temperature, it is immune to further change by accidental or inadvertent exposure to energies which would produce significantly different thermal histories if the material were stored at temperatures within the hysteresis loop. Thus, information recorded on the film may be stored for short periods of time at temperatures below the loop and such information is not easily accidentally destroyed. Too, if a power failure should happen to interrupt the current flowing through a heater which is maintaining a bias temperature in the material, the information stored in the material is not immediately lost. It should be noted, however, that if material is maintained at the holding or bias temperature at all times after the information is recorded therein, such information will be stored indefinitely. The principal way to quickly erase the thermal history (and thus the information) is to heat the material to a saturation temperature above point A.

When a thermochromic film is maintained at an appropriate bias temperature within the hysteresis loop (e.g., point F in FIG. 2), relatively little additional energy need be selectively added to raise discrete portions of the material to higher temperatures, thus writing information into the material. Temperature increases as slight as one-fourth degree centigrade are sufficient to produce significant changes in reflectance when using the steep portion of line 1 which is about midway between the knees of the curve. Information can readily be recorded on the thermochromic material with any source of energy which will be absorbed by the thermochromic material.

In accordance with a preferred embodiment of the invention, information is recorded in a thermochromic film by selectively heating discrete portions of the film with a radiant energy beam, such as an electron or laser beam. The portions of the thermochromic film exposed to the beam are selectively heated and the reflectance thereof changed so as to produce a record of spots exposed to the energy beam.

When a source of radiation of known wavelength is used to supply the thermal energy, the thermochromic material would be selected so that it has a high value of absorptivity at the wavelength used. In the visible portion of the spectrum, cuprous mercuric iodide is highly reflective in the red; but it has a very low reflectance in the 6 to 14 micron region. Thus, $Cu_2HgI_4$ is well suited for absorption of infrared energy and particularly well suited for absorption of the 10.6 micron radiation of the standard carbon dioxide laser. The advantages of cuprous mercuric iodide should be especially appreciated in view of the ready availability of $CO_2$ lasers of high quality.

It has been unexpectedly discovered that extremely high resolution can be obtained in thermally generated images using thermochromic films which exhibit hysteresis. In fact, the spatial resolution exhibited by $Cu_2HgI_4$ exceeds that of most photochemical films and is inferior only to the best high resolution spectroscopic plates. Resolution quality in the one micron range is routinely observed (though not with the unaided eye) in recording images by simply focusing the optical image on a suitably biased film of thermochromic material and insuring that the beam power is sufficient to permit rapid exposure. Quite surprisingly, heat from such optical images does not significantly diffuse within the material during exposure times of interest. Of course, untoward diffusion of the energy could be caused by application of greatly excessive amounts of energy through longer exposure times; such application of excess energy would be comparable to overexposure of ordinary light-recording media. Overexposure can be avoided with the exercise of such ordinary care as one would observe in the use of equivalent high quality photographic emulsions with due attention to the reciprocity law formulated by Bunsen and Roscoe.

It will be recognized that the energy absorbed by the thermochromic film is proportional to the product of the power density of the beam and the exposure time. For exposure times of practical interest, this is equivalent to the reciprocity law ($E = Pt$) which is well known to those who work with photographic material. The reciprocity law of thermochromic materials differs from the reciprocity law of photographic materials, however, in that an upper limit exists on the exposure time, said upper limit being dependent on how much diffusion of heat through the film is tolerable. To keep diffusion low and thus achieve high resolution, the power density of the beam should be adequate to permit absorption of sufficient energy to cause a change in reflectance within a period of time that is not appreciably greater than (and preferably is shorter than) the ratio of the square of a given diffusion length and the material's thermal diffusivity.

A lower limit also exists on the power density of the exposing radiation, i.e., the material has a threshold (which is temperature-dependent) below which no exposure will occur. For example, when the film is kept at a bias temperature corresponding to point F (FIG. 2), this threshold has been experimentally found to be on the order of 100 milliwatts/cm² for cuprous mercuric iodide in silicone varnish. Such a threshold is related to the above-mentioned upper limit on time, in that the threshold is a function of the thermal properties of the material and its environment. Fortunately, the power density threshold has always been found to be so low as never to constitute a limitation on use of the material. Furthermore, the minimum exposure time involved (even for resolutions of one micron) are sufficiently long that they can be easily obtained and do not lead to prohibitively large power densities.

The thermal diffusivity of a material is given by the equation:

$$k = K/c_p p$$

where
 $c_p$ = specific heat of film at constant pressure, cal/gm° C
 $p$ = density of film, gm/cm$^3$
 $K$ = thermal conductivity of the film, cal/cm° C sec To treat the aforementioned diffusion length, let it be assumed that heat is applied to a finite spot on the surface of the material. The excess radius, $l$, of the resulting spot at a time, $t$, after application of heat is given by $$l^2 = kt$$

where $k$ is the thermal diffisivity. The excess radius, $l$, in this example is more generally referred to as the diffusion length. To achieve good resolution, $l$ must naturally be kept low; exactly how low seems necessary is, of course, dependent upon the wavelengths of the electromagnetic radiation being used in the recording process. Since the thermal diffusivity of a given material is fixed, control of diffusion length is achieved by keeping the time of application of heat short.

To illustrate how diffusion of heat is controlled, let is be assumed that a beam of radiant energy is focused to a diameter of one micron. When the beam impinges on the film, the directly heated spot is thus one micron in diameter. Let it next be assumed that it is desired to limit thermal diffusion of heat through the film with the result that after the beam has been removed the resulting spot is no larger than 2 microns. To determine how fast the heat must be applied, the thermal time constant, $\tau$, for this example must be calculated. The excess of spot diameter due to diffusion of heat is $2 - 1 = 1$. Thus, $l$ is one-half of this, or $½ \times 10^{-4}$ cm. Assuming the film to be cuprous mercuric iodide suspended in a silicone varnish, a value for the specific heat (at the upper transition temperature) of about 1.1 calories/gram ° C is reasonable. The density of cuprous mercuric iodide is about 6 gms/cm$^3$, and the density of the silicone varnish is about 1 gm/cm$^3$; since relatively little varnish is necessary to hold the thermochromic material, a density of about 5 gms/cm$^3$ for the dry film is typical. The thermal conductivity of the film will usually be influenced by the vehicle, which has the lower thermal conductivity. Since the thermal conductivities of varnishes are relatively low, the value for the silicone varnish is reasonably assigned as the value of thermal conductivity for the entire film, e.g., $5 \times 10^{-6}$ cal/cm° C sec. (Because the time periods are very short, the thermal characteristics of the substrate usually have no bearing on resolution in the film.) Using the aforementioned equation and these exemplary values, this particular thermal constant is found to be $2.5 \times 10^{-3}$ sec, as follows:

$$\tau = l^2/k = l^2 c_p p/K$$

$$= \frac{\left(\frac{1}{2} \times 10^{-4}\right)^2 (1.1)(5)}{5 \times 10^{-6}}$$

$$= 2.5 \times 10^{-3} \text{ sec}$$

If the exposure time is appreciably greater than the thermal time constant, e.g., more than 10 times the thermal time constant, then one can expect that diffusion of heat away from the spot where heat is actually being applied would produce effects similar to "blooming" in photographic materials. "Blooming," when controlled, can be used to advantage by permitting the unaided eye to see a thermally generated image made with a beam of energy smaller than the eye's threshold.

Assuming that the maximum exposure time which can be permitted is the time period to limit diffusion to ½ micron, it must next be determined what power the beam must have in order to raise the temperature of the material by the desired amount. It has been experimentally determined that an exchanged energy density of about 30 millijoules/cm$^2$ is sufficient to change the reflectance from a value near one end of the hysteresis loop to a value near the other end of the loop. (Calculation of the theoretical exchanged energy density-disregarding all losses-has given a value on the order of 15 millijoules/cm$^2$.) Next, dividing 30 millijoules/cm$^2$ by the time period of $2.5 \times 10^{-3}$ seconds, the power of the necessary beam is determined to be about 13 watts/cm$^2$. For the assumed beam diameter of 1 micron, the power required would be a modest 0.1 microwatts.

In situations where less precise resolution can be tolerated, the exposure time can be lengthened and the power requirement reduced in accordance with the aforementioned reciprocity law. For example, an exposure time of 30 seconds has been employed with the material described above, and the resolution was determined to be at least as good as 50 microns. On the other hand, a 10-watt carbon dioxide laser beam focused to a diffraction-limited spot will supply sufficient energy to raise the temperature of the thermochromic film illuminated thereby at least ¼° with exposure times in the nanosecond range. Faster heating may be accomplished with appropriate energy sources.

The exposure time and the energy absorbed from the beam have been emphasized herein as if these two parameters alone dictated the total diffusion which will be realized. This is essentially correct, although a thorough study of FIG. 2 will reveal that these two parameters are involved only in that portion of the cycle represented by the curve segment from point F to point G. Removal of the heating source at a time when the material has been heated to point G does not simultaneously terminate the diffusion of all heat away from the spot which the beam or beams actually struck; diffusion actually terminates only when the temperature of the locally heated spot has returned to the temperature of the remainder of the material, i.e., when the heated and non-heated portions have again reached thermal equilibrium. However, the diffusion of heat associated with cooling, e.g., from point G to point H in FIG. 2, is not nearly as great as that associated with heating. The diffusion of heat is lower because there is an anomaly in the specific heat curves for heating and cooling just as there is an anomaly in the two reflectance curves. The average of the specific heat values of cuprous mercuric iodide in cooling from point G to point H is only about one-tenth as large as the average value for the corresponding portion of the heating curve. Thus, whatever heat is still being diffused as the material cools from point G to point H, is leaving a region of relatively low specific heat and entering a region of high specific heat. Accordingly, heating of the surrounding region by virtue of diffusion effectively terminates as soon as the heat source is removed.

The discovery of the extremely high resolution capability is most unexpected, since high resolution is not normally associated with thermally generated images. It is believed that the ultimate resolution which can be obtained is singularly a function of the grain size of the material, which can be very samll, e.g., at least as small as 1 micron.

Figure 4:
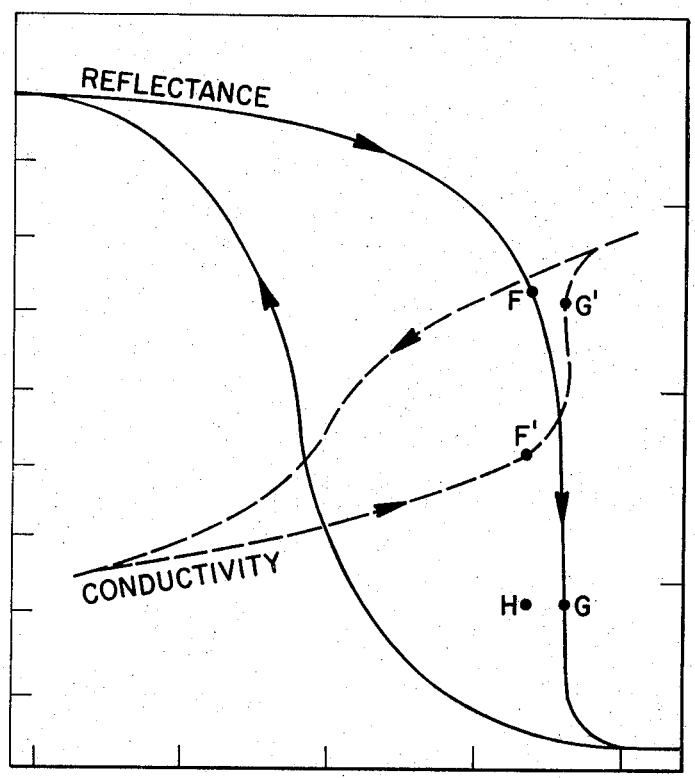
FIG. 4 is a plot of electrical conductivity versus temperature for cuprous mercuric iodide superimposed on a plot of reflectance versus temperature for the same material.

It is also known that thermochromic compounds, and thus thermochromic films, exhibit a change in electrical conductivity coincident with change in reflectance. Cuprous mercuric iodide, for example, exhibits a change in conductivity of one to two orders of magnitude when passing through the reflectance transition range. The electrical conductivity also shows a hysteresis behavior. FIG. 4 is a plot of conductivity versus temperature for cuprous mercuric iodide, superimposed on a plot of temperature versus reflectance for the same material. As shown in the figure, the conductivity of a film of cuprous mercuric iodide changes from about $5.5 \times 10^{-7}$ mhos/cm at 64° C to about $5.5 \times 10^{-6}$ mhos/cm at 68° C. This change in conductivity is coincident with a change of about 78 percent in reflectance of red light.

Figure 5:
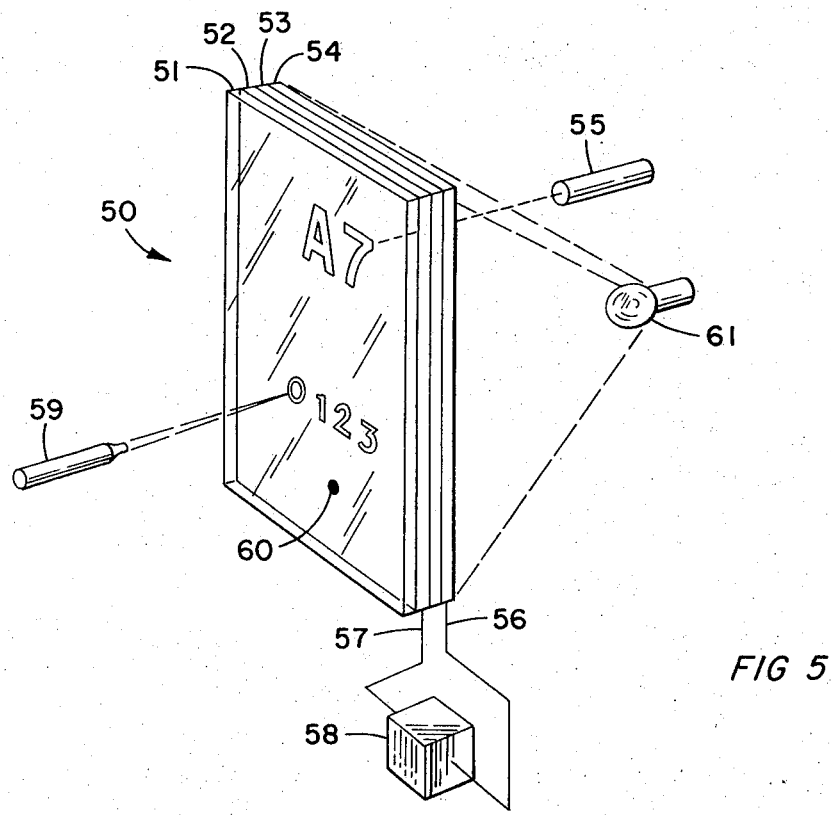
FIG. 5 is a schematic illustration of one embodiment of the display device of the invention.

Turning now to specific embodiments employing thermochromic materials, a display screen 50 constructed in accordance with the invention is shown in FIG. 5. The screen 50 generally comprises a transparent carrier 51 with a transparent layer of electrically conductive material 52, such as tin oxide ($SnO_2$) on one surface thereof. A layer or film of thermochromic material 53 is adjacent the transparent conductor 52 and the thermochromic film 53 covered with another electrically conductive layer 54. Since the display will be viewed from the carrier side of the device, conductive layer 54 need not be transparent, and may be a thin metal film. A suitable material for the layer 54 is Invar, a ferrous material which is particularly noted for its dimensional stability with changing temperature.

In operation of the display, a character or image may be written into film 53 for visual display by maintaining the composite screen 50 at a suitable bias temperature (corresponding, for example, to point F in FIG. 2) and tracing the desired character or image on the film 54 with a beam from a suitable energy source 55 such as an electron gun. Any suitable conventional means may be used for maintaining the thermochromic film at the desired bias temperature. For example, the entire display screen 50 may be heated with radiation from radiant heater 61. Alternatively, the film 53 may be heated by passing current through either conductive layer 52 or 54 or an additional resistance heating element (not shown) incorporated in the structure. Energy from the energy source 55 is absorbed by the thermochromic film 53, and the reflectance of the film altered in a pattern precisely corresponding to the trace of the beam. Therefore, the trace (shown as the characters A7) of the beam can be visible to a viewer on the opposite side of the screen 50, provided the heated portion is on the order of 30 microns or greater so that it is above the eye's threshold. Since the reflectance is altered along the trace of the beam, the screen 50 becomes a passive display when illuminated from the side of the viewer. As long as the screen 50 is maintained near the bias temperature, the characters will remain visible.

The trace can be erased from the screen 50 by simply raising the temperature of the film 53 to a temperature above its high temperature saturation point (A on FIG. 2). By then cooling the film 53 below its cold saturation point (point C on FIG. 2), it is returned to a usable state.

In some applications of the device 50 described above, the trace of energy source 55 may be insufficient to raise the temperature of film 53 enough to cause a large change in reflectance; thus, the contrast between the trace and the remainder of the film may be less than desired. To overcome this deficiency, conductive leads 56 and 57 may be attached to conductive layers 52 and 54 and a voltage impressed across the thermochromic film 53 by a suitable source 58. Since the electrical conductivity of the thermochromic material is significantly altered by the same change in temperature that affected the reflectance, the film 53 is in an ideal condition for one type of image enhancement. By impressing a voltage across the film 53 between conductive plates 52 and 54, current will pass through the film 53 and it will be concentrated in the areas of highest conductivity. Since the thermochromic material stimulated by the energy source 55 will be of higher electrical conductivity as a result of the trace, the material affected by the thermal energy will be even further heated by joulse heating, thus further increasing the temperature of the material initially affected and enhancing the change in reflectance. The background may be subject to some broad-area joule heating, but it will not be nearly as much as the joule heating at the trace. In this manner the display traced on screen 50 by a weak energy source can be substantially enhanced and presented to the viewer in acceptable form. Also, narrow traces that are too thin to be seen by the unaided eye can be widened by this technique to the extent that they are easily discernable.

From the foregoing it will be seen that the device of FIG. 5 may be operated as passive display to immediately record and display information written thereon with a suitable energy source. The display is passive, and a single pass of the recording beam writes the information into the display. The information is recorded and simultaneously displayed until changed or erased.

When a thermochromic film is maintained at a suitable holding temperature (e.g., the temperature corresponding to points F and and F' in FIG. 4), the reflectance and conductivity of any discrete portion thereof may be altered to record an image in the film by selectively heating a portion of the film to a higher temperature such as the temperature corresponding to point G. The reflectance of the heated portion will fall to that indicated by point G, and the electrical conductivity will rise to that indicated by point G. Even though the temperature of the heated portions is reduced such that the entire display is again stabilized at the temperature equivalent to points F and F', the reflectance and conductivity of the heated portions of the film remain essentially at the values corresponding to G and G'.

Information can also be written into the display 50 from the viewer side. For example, the viewer may trace an image or any other desired character into the film 53 with a suitable light pencil 59 or heated probe by tracing the desired character on the surface or viewing screen 51. The light pencil used need only supply sufficient energy to alter the physical characteristics of the thermochromic film 53 by a few percent in order to make possible later interrogation. If it is known beforehand that a weak energy source must be used to record with, it is possible to obviate at least some problems by using a ternary halide film and pre-heating the film to just below the "switching" threshold before recording is commenced. The electrically conductive plates, of course, provide a convenient method for accomplishing such pre-heating.

When information written into the thermochromic film is no longer needed, it can be erased by heating the film to a temperature above its high-temperature saturation point (a temperature above the hysteresis envelope). It is then preferable to reduce the film to a temperature below the hysteresis envelope before again establishing a bias temperature. This sequence of steps will insure that the thermochromic film is at a point on the hysteresis envelope rather than on an inner hysteresis loop. The erasing procedure, of course, may be applied to the entire film or, with suitable controls, to any portion thereof.

It has also been discovered that the reflectance of portions of a thermochromic film can be altered by another method which, although not fully understood, can be conveniently and easily performed and is referred to hereinafter as "reflectivity inversion." The reflectivity inversion is, in effect, the changing of the material from a high temperature reflectance condition to a lower temperature reflectance condition by adding still more energy to the material. Such a change cannot be explained with reference to hysteresis curves alone. It has been discovered that the changed reflectance of a spot of thermochromic material which has been temporarily heated, such as spot 60 in FIG. 5, can be inverted so as to exhibit the same reflectance as the unaltered material surrounding spot 60 without cycling the material through the ends of the hysteresis envelope. This surprising reflectivity inversion can be accomplished by again heating spot 60, although with somewhat less energy than that required to record spot 60. That is, the energy required to invert the reflectance of the material is less per unit area of exposed film than the energy per unit area required to record the spot in the film.

Figure 6:
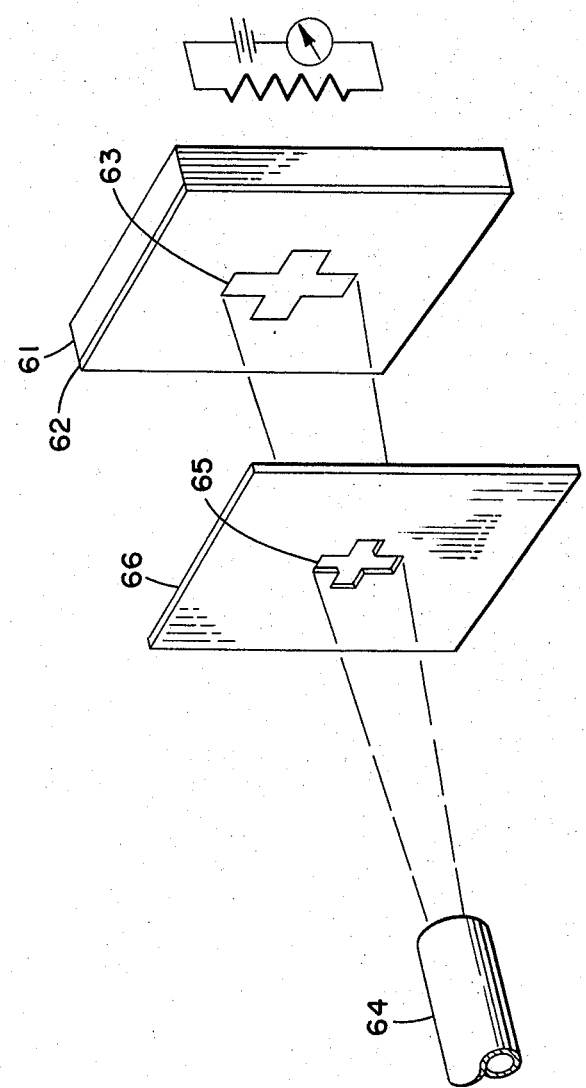
FIG. 6 is a schematic illustration of an alternative display device demonstrating the principles of the invention.

The following example illustrates how this phenomenon is observable. The surface of a copper plate 61 was coated with a paint of thermochromic material 62 as shown in FIG. 6. Thermochromic film 62 was a paint comprising 2.7 parts of cuprous mercuric iodide to one part silicone varnish, by weight. The dried layer 62 was approximately 0.001 inch thick. Copper plate 61 was maintained at a temperature of 65.5° C with suitable resistors and an image 63 recorded thereon by passing the beam from a $CO_2$ laser 64 through aperture 65 in a mask 66.

Carbon dioxide laser 64 was operated at a total beam power of about 10 watts. The beam was slightly divergent, but an adequate power density, i.e., at least 50 mW/cm$^2$, existed at the surface of the thermochromic film to cause the film to change from a low-temperature reflectance to a high-temperature reflectance. The diameter of the beam at the aperture 65 was at least large enough to fill the aperture. It should be understood that a portion of the beam from laser source 64 may be considered to pass directly through aperture 65 undeflected, and a portion of the beam may be considered to be diffracted from the edges of the aperture. In language familiar to those versed in holography, the undeflected portion of the original beam may be called the reference beam, and the diffracted portion of the original beam may be termed the object beam. The superposition of the object and reference beams at the film 62 gives rise to an interference pattern which is recorded in the film 62. Under the above conditions, a well defined black-on-red interference fringe pattern was formed in the thermochromic film 62 after exposure for about 30 seconds.

Mask 66 was then removed; the temperature of substrate 61 was 65.7° C. With the mask 66 absent, the film 62 (including the fringe pattern 63) was then illuminated with the same laser source 64 for a total exposure time of about 30 seconds. After termination of illumination, the entire illuminated area was seen to be in the black or high temperature state. However, almost immediately after termination of illumination, the initially black fringe pattern reappeared as a red pattern against the relatively black background of those film portions immediately surrounding the original pattern. Thus, the film portions which were still red after the first illumination were darkened by the second illumination, while the portions darkened by the first illumination were inverted to a red appearance by the second illumination. Emphasis should perhaps be given to the fact that the reflectance of the black portions of the fringe pattern 63 was inverted to its original red color without employing the usual "erasing" processes. Changing red portions of the fringe pattern 63 to black is more straightforward, and could have been easily predicted by merely examining the hysteresis envelope.

While the same energy source was utilized for recording fringe pattern 63 and for inversion thereof, it will be recognized that the inversion of the material corresponding with fringe pattern 63 was accomplished with less energy per unit area of film than that used to record fringe pattern 63, since the dark portion of the fringe pattern is the product of constructive interference between radiation passing unobstructed through the aperture 65 and that diffracted from the edges of aperture 65. Thus, the laser energy used to record 63 is greater than the energy per unit area of exposed film when the same laser source is used to illuminate the film 62 without being obstructed by mask 66.

Utilizing the principles discussed above, a recording display may be constructed which immediately displays information recorded therein and which may be corrected or up-dated as desired without erasing the entire display. For example, a series of characters may be thermally written into the film 53 of device 50 as described hereinabove with reference to FIG. 5. By maintaining the film 53 at a holding temperature near the inflection point on the reflectance envelope, information is easily recorded and passively displayed. Individual characters in the displayed series may be erased and replaced by new characters by carefully tracing the character to be erased with a slightly lower energy beam than that used to record it, thus "inverting" the material and eliminating contrast between the character and its background. A new character may then be written into the space previously occupied by the erased character, thus up-dating the display without erasing the entire display.

It should be noted that such up-dating can be accomplished by either retracing the recorded characters with a lower power recording beam, such as from an electron gun 55, or by retracing the character to be erased with another suitable energy source, such as a light pencil, from the viewer's side of the display. For example, a series of numerals may be written into film 53 with an electron gun 55 driven in response to read-out signals from a computer. The series of numerals will then be immediately displayed and visible to the viewer. Should the viewer then wish to alter the information displayed, selected numerals may be erased with a simple light pencil which has sufficient power to invert the reflectivity of the film 53 displaying the numerals to be erased. With a light pencil having somewhat greater power, the viewer can write new numerals into the inverted material. Alternatively the thermochromic film may be used as memory device wherein information may be recorded from different sources, such as by writing from both sides of the film.

It will be understood that the up-dating procedure described is in no way limited to the correction of numerically displayed information. Any information displayed on film 53, whether in the form of numerals, spots, optical images, or other optical information, may be similarly erased and replaced from either side of the display screen; thus, the thermochromic display provides a unique interface between machine and operator capable of displaying, recording, receiving and otherwise transferring information between the operator and the machine.

In an alternative embodiment, display 50 may be utilized as a permanent recording display. In such an embodiment, thermochromic film 53 is most advantageously made moveable with respect to the conductive plates 52 and 54. For example, film 53 may be a non-metallic or metallic sheet, e.g., polyethylene or Invar, which is coated, painted or impregnated with the thermochromic material. The sheet may be drawn between plates 52 and 54 as required by suitable means such as rollers or the like. In most respects, display 50 is operated as described hereinabove. However, if a permanent record of the information shown at any time on the display is desired, an electrical potential which is larger than those described above is impressed across the film 53. As noted above, the portions of film 53 which have the highest conductivities, i.e., the recorded portions, will be heated the most by joule heating as current passes therethrough. As a result of excessive heating, the thermochromic material will become oxidized, and suitable controls will insure that oxidation occurs only in the areas where the conductivity of the film has been increased by prior formation of a thermal image. Accordingly, the thermal image is permanently formed in the film. The film may then be withdrawn for permanent storage and new film introduced between the plates 52 and 53.

It should also be noted that although the specific embodiments of the invention have been described with specific reference to using the increasing-temperature curve of the hysteresis loop, the decreasing-temperature portion of the curve may also be utilized in similar fashion. However, in operating on the decreasing-temperature curve, information must be written into the film by selectively lowering the temperature of discrete portions of the thermochromic film. This may be accomplished using cold probes and the like. However, since information is readily encoded in optical or thermal energy pulses, the principles of the invention are more readily applied in apparatus operating on the increasing-temperature portion of the curve.

From the foregoing it will be observed that the principles of the invention disclosed herein may be embodied in various forms to provide a unique direct interface for transmitting information between man and machine and vice versa. It is to be understood that although the invention has been described with particular reference to specific embodiments thereof, the forms of the invention as shown and described in detail are to be taken as preferred embodiments of same, and that various changes and modifications may be resorted to without departing from the spirit and scope of the invention.

What is claimed is:

1. The method of producing a visible display corresponding to discrete portions in a thermochromic recording medium, comprising the steps of:
  a. positioning a thermochromic film between a pair of electrically conductive members, said thermochromic film being characterized by having a reflectance hysteresis loop bounded by a minimum saturation temperature associated with its high temperature reflectance and a maximum saturation temperature associated with its low temperature reflectance, said film also being characterized by having a negative temperature coefficient anomaly, and at least one of said conductive members being transparent;
  b. establishing a first temperature in said film between said maximum saturation temperature and said minimum saturation temperature;
  c. raising the temperature of discrete portions of said film to a second temperature which is higher than said first temperature, for increasing the electrical conductivity of said discrete portions, with said discrete portions constituting recorded information which is to be displayed;
  d. subsequently applying a voltage bias across the two conductive members so that current will pass through said film and between said conductive members, said current producing joule heating in said discrete portions of said film and raising the temperature of said discrete portions of said film to a third temperature which is greater than said second temperature, for increasing the contrast of said visible display.

2. The method set forth in claim 1 wherein said third temperature is les than the said minimum saturation temperature associated with the high temperature reflectance of said film.

3. The method set forth in claim 1 wherein said third temperature is substantially greater than the minimum saturation temperature associated with the high temperature reflectance of said film.

4. The method set forth in claim 1 wherein said first temperature is maintained at approximately the midpoint between said maximum saturation temperature and said minimum saturation temperature.

5. The method of producing an optical display, comprising the steps of:
   a. establishing a bias temperature in a thermochromic film which exhibits hysteresis in changing from a first reflectance and electrical conductivity to a second reflectance and electrical conductivity with change in temperature over a certain range, said film having a maximum saturation temperature associated with its low-temperature conductivity and a minimum saturation temperature associated with its high-temperature conductivity, and said film having a threshold within the hysteresis loop at which the material experiences a change in its physical order, and said bias temperature being established by heating the thermochromic film directly from a low-temperature condition, with said bias temperature being approximately midway between the minimum saturation temperature and the maximum saturation temperature of said film;
   b. selectively heating a portion of said film corresponding to the information to be displayed to a second temperature which is above said first temperature but below the threshold temperature of said film, whereby the electrical conductivity of said selected portion is increased; and
   c. passing current through said selected portion of said film which has been heated to a second temperature, said current being sufficient to cause joule heating of said selected portion and raising the temperature thereof to a third temperature which is greater than said threshold temperature, whereby the contrast of said optical display will be increased when the current film is terminated.

6. A display device, comprising:
   a. a thermochromic film which exhibits hysteresis in changing from a first reflectance to a second reflectance with change in temperature, said thermochromic film having a hysteresis loop bounded by a minimum saturation temperature associated with its high temperature reflectance and a maximum saturation temperature associated with its low temperature reflectance;
   b. first and second electrically conductive sheets adjacent opposite sides of said thermochromic film, with at least one of the conductive sheets being transparent in the visible portion of the spectrum;
   c. means for establishing a first temperature in said film between said minimum saturation temperature and said maximum saturation temperature;
   d. in selected portions of said film corresponding to the information to be displayed, means for raising the temperature of said portions to a second temperature which is higher than said first temperature, for increasing the electrical conductivity of said selected portions; and
   e. means for increasing the contrast of said displayed information comprising a voltage source electrically interconnecting said first and second electrically conductive members.

7. The device set forth in claim 6 wherein said means for raising the temperature of selected portions of said film includes an electron beam.

8. The device set forth in claim 6 wherein said means for raising the temperature of selected portions of said film includes a source of optical energy.

9. Display apparatus, comprising:
   a. a transparent viewing screen;
   b. a first electrically conductive and transparent member adjacent one surface of said viewing screen;
   c. a thermochromic film which exhibits hysteresis in changing from a first reflectance to a second reflectance with change in temperature, the hysteresis loop of said film being bounded by a minimum saturation temperature associated with its high temperature reflectance and a maximum saturation temperature associated with its low temperature reflectance, one surface thereof being adjacent the surface of said first conductive member opposite said viewing screen;
   d. a second electrically conductive member adjacent the other surface of said thermochromic film;
   e. means for establishing a first temperature in said thermochromic film between said maximum and minimum saturation temperatures; and
   f. means for temporarily raising the temperature of selected portions of said thermochromic film corresponding to the information to be displayed to a second temperature which is higher than said first temperature and lower than said minimum saturation temperature, for increasing the electrical conductivity of said selected portions so that when a voltage is applied across said electrodes the contrast of said displayed information is increased.

10. The apparatus set forth in claim 9 wherein said means for temporarily raising the temperature of selected portions of said film is a source of radiant energy directed onto said film through said second conductive member.

11. The apparatus set forth in claim 9 and further including a second means for temporarily raising the temperature of portions of said thermochromic film to a second temperature which is higher than said first temperature, said second means being adapted to transmit energy to selected portions of said thermochromic film through said viewing screen.

12. The apparatus set forth in claim 9 and further including means for impressing a voltage across said thermochromic film between said first and second electrically conductive members.

13. The apparatus set forth in claim 9 and further including:
   a. means for scanning said thermochromic film with an energy beam which imparts substantially less thermal energy to said thermochromic film than said means for temporarily raising the temperature of selected portions of said film; and
   b. means for measuring the current flow between said first and second electrically conductive members relative to the energy supplied to said thermochromic film by said scanning means.

14. The apparatus set forth in claim 9 wherein said thermochromic film consists essentially of material selected from the group consisting of:

a. material having the general formula $$M_2M'X_4$$

where M is $Ag^{1+}$, $Cu^{1+}$ or $Tl^{1+}$ and
M' is $Hg^{2+}$ or $Cd^{2+}$,
X is a halide b. material having the general formula $$MM'_2X_4$$

where M is zinc, cadmium or mercury,
M' is aluminum, gallium or indium, and
X is sulphur, selenium or tellurium; and c. the vanadium oxides.

15. In a thermochromic material whose reflectance exhibits hysteresis with change of temperature over a certain range of temperatures, and whose reflectance changes at a first, rapid rate upon being cooled from temperatures below a certain threshold within the hysteresis loop, and whose reflectance changes at a second, slower rate upon being cooled from above the certain threshold value, the method of creating a visible display in a layer of the material comprising the steps of:

a. initially establishing the layer of thermochromic material at a temperature just below the threshold temperature;

b. heating those portions of the layer which are to be displayed to a temperature which is just above the threshold temperature, such that an initial contrast is established between said heated portions and the background portions; and subsequently c. cooling the layer of material to establish thermal equilibrium at a temperature within the hysteresis loop, whereby the background portions have their reflectance changed by a greater amount than do said heated portions and the final contrast between the heated and background portions is appreciably greater than said initial contrast.

16. The method of creating a visible display as claimed in claim 15, wherein the initial temperature in the material is established with joule heating and wherein those portions of the layer which are to be displayed are heated with radiant heat.

17. The method of creating a visible display as claimed in claim 15 wherein the thermochromic material is cuprous mercuric iodide, the layer of material is initially heated to a temperature of about 66° C, and the display portions are heated to about 68° C.

18. The method of creating a visible display as claimed in claim 17 wherein the layer of thermochromic material is brought back to thermal equilibrium at about 64° C after said display portions have been heated to about 68° C.

19. The method of producing a visible display consisting of discrete portions of a thermochromic recording medium whose reflectance is different than the background, comprising the steps of:

a. heating a thermochromic film to a temperature just below its threshold value, said film comprising a ternary iodide suspended in a suitable binder, and said threshold value constituting the value on a temperature-increasing curve at which the reflectance of the film upon cooling more nearly approaches the temperature-decreasing portion of the hysteresis envelope than the temperature-increasing portion of the hysteresis envelope;

b. subsequently heating those portions of the thermochromic film which are to be displayed to a temperature above the threshold value; and c. subsequently cooling the film, whereby those portions heated above the threshold will follow a reflectance path whose slope is significantly different from the slope of the reflectance path followed by material which was not heated to the threshold value.

20. The method of affecting information recorded in a thermochromic display, comprising the steps of:

a. establishing a bias temperature in a thermochromic film which exhibits hysteresis in changing from a first reflectance to a second reflectance with change in temperature over a certain range, with the bias temperature being within the material's hysteresis loop;

b. momentarily directing a spatially modulated beam of radiant energy at the film such that discrete portions of the film are heated, whereby said discrete portions will have a different reflectance than the unheated portions with the result that information is recorded;

c. restoring thermal equilibrium in the film by permitting the discretely heated portions to cool back to substantially the bias temperature; and d. causing the discretely heated portions to revert to their originally established reflectance by again directing a spatially modulated beam of radiant energy at the film, with the energy density of the second beam being slightly less than the energy density of the first beam.

* * * * *